United States Patent
Silva et al.

(10) Patent No.: US 6,473,081 B1
(45) Date of Patent: Oct. 29, 2002

(54) DEPICTING HIERARCHICALLY RELATED GRAPHICAL COMPONENTS

(75) Inventors: Daniel D. Silva, San Rafael; Gary S. Yost, Mill Valley; Phillip Miller, Petaluma, all of CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/304,230

(22) Filed: May 3, 1999

Related U.S. Application Data (60) Provisional application No. 60/085,436, filed on May 14, 1998.

(51) Int. Cl.$^7$ .............................................. G06T 17/00
(52) U.S. Cl. ...................................................... 345/420
(58) Field of Search ................... 345/418, 419, 345/420, 423, 424, 425, 427

(56) References Cited

U.S. PATENT DOCUMENTS 5,751,931 A * 5/1998 Cox et al. .................. 345/420
5,929,858 A * 7/1999 Shibata et al. .............. 345/418
6,249,284 B1 * 6/2001 Bogdan ...................... 345/357

\* cited by examiner

*Primary Examiner*—Cliff N. Vo
(74) *Attorney, Agent, or Firm*—Hickman Palermo Truong & Becker LLP; Marcel K. Bingham (57) ABSTRACT

A mechanism for depicting a plurality of graphical components is provided. According to an aspect of the present invention, a graphical component hierarchy is displayed. A graphical component hierarchy includes graphic nodes that each correspond to a graphical component, links between graphic nodes, and images associated with graphic nodes. A link between graphical components represent manipulations performed between the graphical components. The graphical component hierarchy includes images for each graphical component, graphically representing how they affect a final image at various stages.

20 Claims, 7 Drawing Sheets

DEPICTING HIERARCHICALLY RELATED GRAPHICAL COMPONENTS

This application claims the benefit of U.S. provisional patent application No. 60/085,436 entitled "Method and System for Manipulating Digital Visual Information", filed May 14, 1998, by inventors Stewart Sabadell, John Hutchinson, Nikoilai Sander, and Michael Larson, which is incorporated herein by reference.

COPYRIGHT DISCLAIMER

A portion of the disclosure of this patent document contains material which is subject to copyright protection. The copyright owner has no objection to the facsimile reproduction by anyone of the patent disclosure, as its appears in the Patent and Trademark Office patent files or records, but otherwise reserves all copyright rights whatsoever.

FIELD OF THE INVENTION

The present invention relates to displaying computer graphics, and in particular, to representing relationship between hierarchically related graphical components.

BACKGROUND OF THE INVENTION

Computer generated 3-D animations enrich a wide range of human experience, captivating audiences at the movie theaters, gluing gamers to their personal computers, and embarking home buyers on virtual tours of new homes. To generate 3-D animations, a 3-D artist creates 3-D computer models of the objects. These models are used to emulate the movement, color, and shape of animated objects, from a dancing baby to space ships trekking through the universe.

3-D models are often composed of graphical components that represent the shapes and surfaces that make up modeled objects. A graphical component is a set of data, procedures, or combination thereof used to represent a feature of a graphical object. A graphical component may include multiple other graphical components. For example, a model of the four outside walls of a simple house has four graphical components. Each represents one of four rectangles that come together like the sides of a box. The interior plane of a rectangle represents the surface of a wall. Each graphical component that represents a rectangle further includes two other graphical components, one that defines spatial aspects of the rectangle, and another that defines how the light is reflected from the depicted wall's surface.

A graphical component that defines how light is reflected from a surface is referred to as a material. A material defines various properties of a surface, such as how light is reflected from a surface under normal outdoor light conditions ("diffuse property") or under normal indoor conditions ("ambient property"), and its texture ("bump property"), that is, whether the surface is smooth, bumpy, or gritty.

There are a variety of techniques used to define properties. One technique is to associate a property with a set of values. For example, three values may represent the amount of red, green, and blue in the color of a material's diffuse property.

Another technique for defining material properties is to use a map to affect a material property. A map is a graphical component that defines patterns, such as checkers, zebra stripes, marble mottling, or even photographic images. There are two broad categories of maps, bitmaps and procedure maps. A procedure map is a set procedures used to generate a pattern, such as a fractal pattern.

When a map is associated with a particular material property, a particular manipulation is performed to affect the material property. A manipulation, as used herein, is a set of operations applied to two or more graphical components. For example, a material may define a red surface. To give the red surface a brick wall like appearance, a brick lattice map that depicts joints in a brick wall (i.e. the mortar between bricks) is assigned to affect the diffuse property of the material. The material and the map are then manipulated together to render a brick wall like surface by superimposing the brick joints upon the red surface.

A 3-D artist may use 3-D "modeling software" to build 3-D models and to animate them. An important function of modeling software is to provide a user interface for receiving input from a 3-D artist that specifies the properties of graphical components, and to render the graphical components so that the artist may see what they create.

Figure 1:
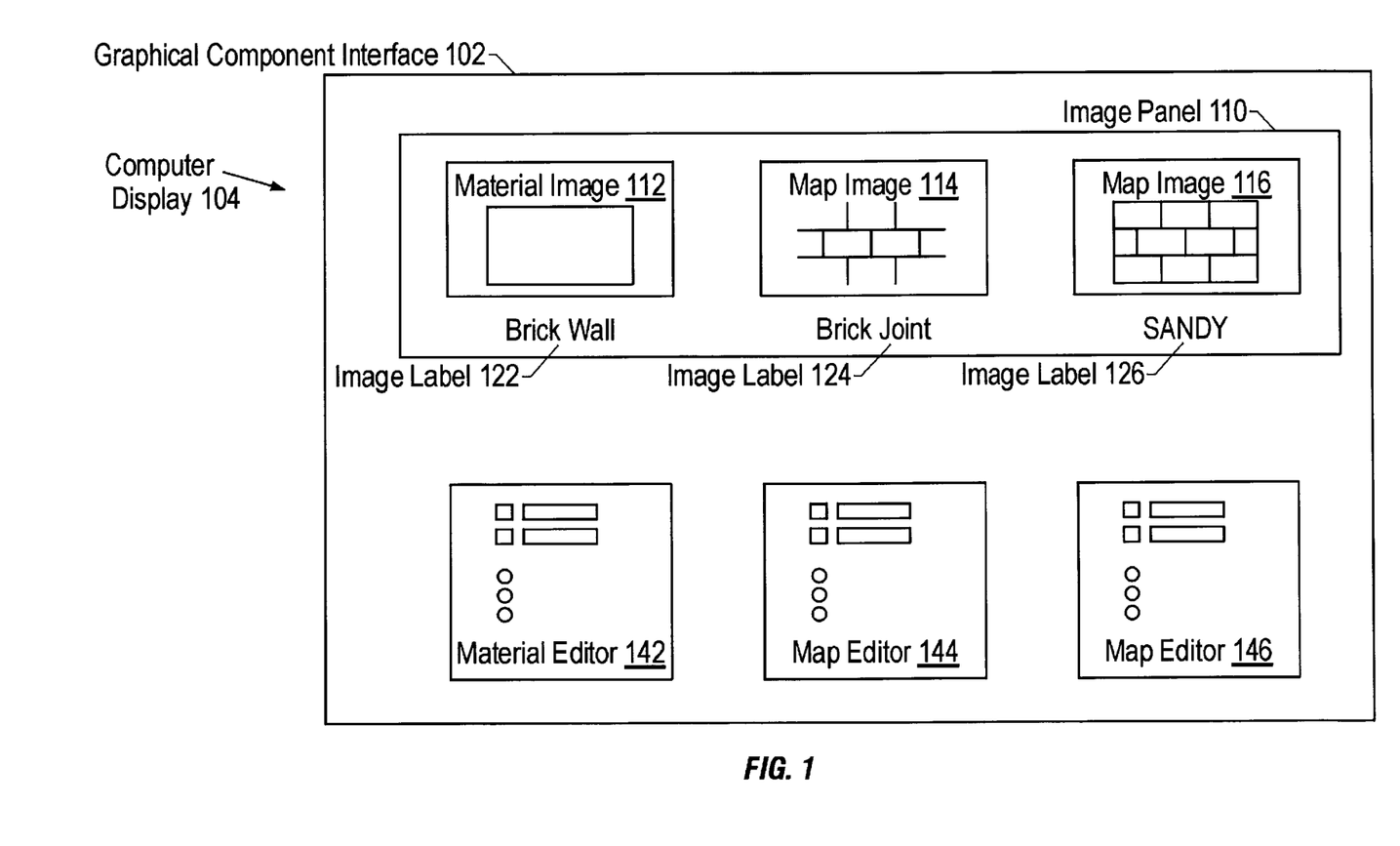
FIG. 1 is a graphical user interface that accepts input from a user specifying properties for graphical components.

FIG. 1 shows a conventional graphical user interface ("GUI") for building graphical components. A GUI is visual display that allows a user to enter data into a computer system by using user input devices to manipulate and interact with user interface controls such as a window, a button, or a dialogue box. Graphical component interface 102 is a GUI that includes graphical user controls for editing graphical components. Graphical component interface 102 receives data indicating various properties of graphical components and operations to perform upon them, including operations for rendering the graphical components. Graphical Component Interface 102 includes image panel 110, material editor 142, and map editors 144 and 146. Image panel 110 contains images of the material being edited, material BrickWall, and other graphical components used to define properties of the material being edited.

In the example shown in FIG. 1, the material being edited is BrickWall, and map BrickJoint and map Sandy are each used to define a property of BrickWall. Image panel 110 includes material image 112, an image of material BrickWall, map image 114, an image of map BrickJoint, and map 116, an image of map Sandy. Image Label 122 is a label specifying the name of the material being edited and displayed in material image 112. Image labels 124 and 126 are labels specifying the name of the maps displayed in map images 114 and 116 respectively.

A 3-D artist may enter data specifying properties of a material and its maps through dialogue boxes material editor 142, map editor 144, and map editor 146. Material editor 142 is used to receive from a user data specifying properties of material BrickWall. Likewise, map editors 144 and 146 are used to receive from a user data specifying properties of materials BrickJoint and Sandy, respectively.

In addition to receiving data input from a user, material editor 142, and map editors 144 and 146 each display a graphical component name and information about properties of the graphical components. For example, material editor 142 displays text indicating that map BrickJoint is used to define material BrickWall's diffuse property. Map Brickwall's map editor 144 shows that map Sandy is used to define the texture property of map BrickJoint.

To achieve a desired effect, a 3-D artist examines the arrangement of graphical components being displayed in graphical interface component 102 to determine which properties of which graphical component to edit. To see whether the changes bring about the desired effect, a 3-D artist changes the properties of the material and its graphical components, and observes the effects of the change upon the surface being rendered. For example, a 3-D artist desires to give the brick joint of material BrickWall a lighter gray color. By examining the graphical component interface 102, the 3-D artists observes the gray lattice-like brick mortar depiction in map image 114, and concludes that map Brick-Joint is used to give material BrickWall its brick joints. The 3-D artist then proceeds to edit a color property of the map BrickJoint, and observes its effect not only on map Brick-Joint in map image 114, but on material BrickWall in material image 112.

More complex materials are composed of a greater number of maps. Some of these may contain other maps, creating a complex hierarchical arrangement. Such an arrangement is not clearly depicted by the sequence of images in image panel 110. When the relationship between graphical components of a complex material is not clear from the structure of images presented in image panel 110, deciphering the numerous dialogue boxes and images displayed in graphical component interface 102 to ascertain the complex relationship between the graphical components is a very tedious and tiresome task.

For example, assume that graphical component interface 102 is being used to edit a material that has properties defined by many maps. These maps include a map A, which is used to define the diffuse property of the material. Several properties of map A are defined by a map B and a map C.

For the material and each map there is an image in image panel 110. To find a map that is being used to define a diffuse property of the material, a 3-D artist examines the material editor 142 for text that describes the name of the map assigned to the diffuse property. After determining that the map's name is A, the 3-D artist decides to view map A's image. To find it, the artist reads the image labels in an image panel to find a label with the text "A". Next, the 3-D artist decides to examine map A's properties. The artist examines the map editors in graphical component interface 102 until the artist finds a map editor indicating it is for map A. Alternatively, the 3-D artist clicks on the image of map A to activate its map editor. The 3-D artist then decides to examine the maps used to define map A. The 3-D artist examines the map editor for map A and determines that map C and map D are used to define various properties of map A. To find the images of map C and map D, the 3-D artist repeats the process of searching the labels in image panel 110. If the 3-D artist wishes to examine another material property, and the tree of maps assigned to the property, the 3-D artist repeats the process described above.

The process of deciphering graphical component interface 102 becomes more tedious for more complex materials. This tedium can wear down a 3-D artist, especially those that work on complex materials for relatively long periods of time. Therefore, it desirable to provide a mechanism that more clearly conveys the arrangement of graphical components that comprise another graphical component, and in particular, that more clearly depicts the arrangement of maps that compose a material.

SUMMARY OF THE INVENTION

A mechanism for depicting a plurality of graphical components is described. According to an aspect of the present invention, a graphical component hierarchy is displayed. A graphical component hierarchy includes graphic nodes that each correspond to a graphical component, links between graphic nodes, and images associated with graphic nodes. A link between graphical components represents manipulations performed between the graphical components. The graphical component hierarchy includes images for each graphical component, graphically representing how they affect a final image at various stages.

According to another aspect of the present invention, a user may select graphical components depicted in a graphical component hierarchy for the purpose of performing a set of operations upon the selected graphical components, such as altering their properties. The user may alter the graphical component hierarchy to affect the properties of graphical components, and the way in which they are manipulated together to form images.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for depicting an arrangement of graphical components is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 2:
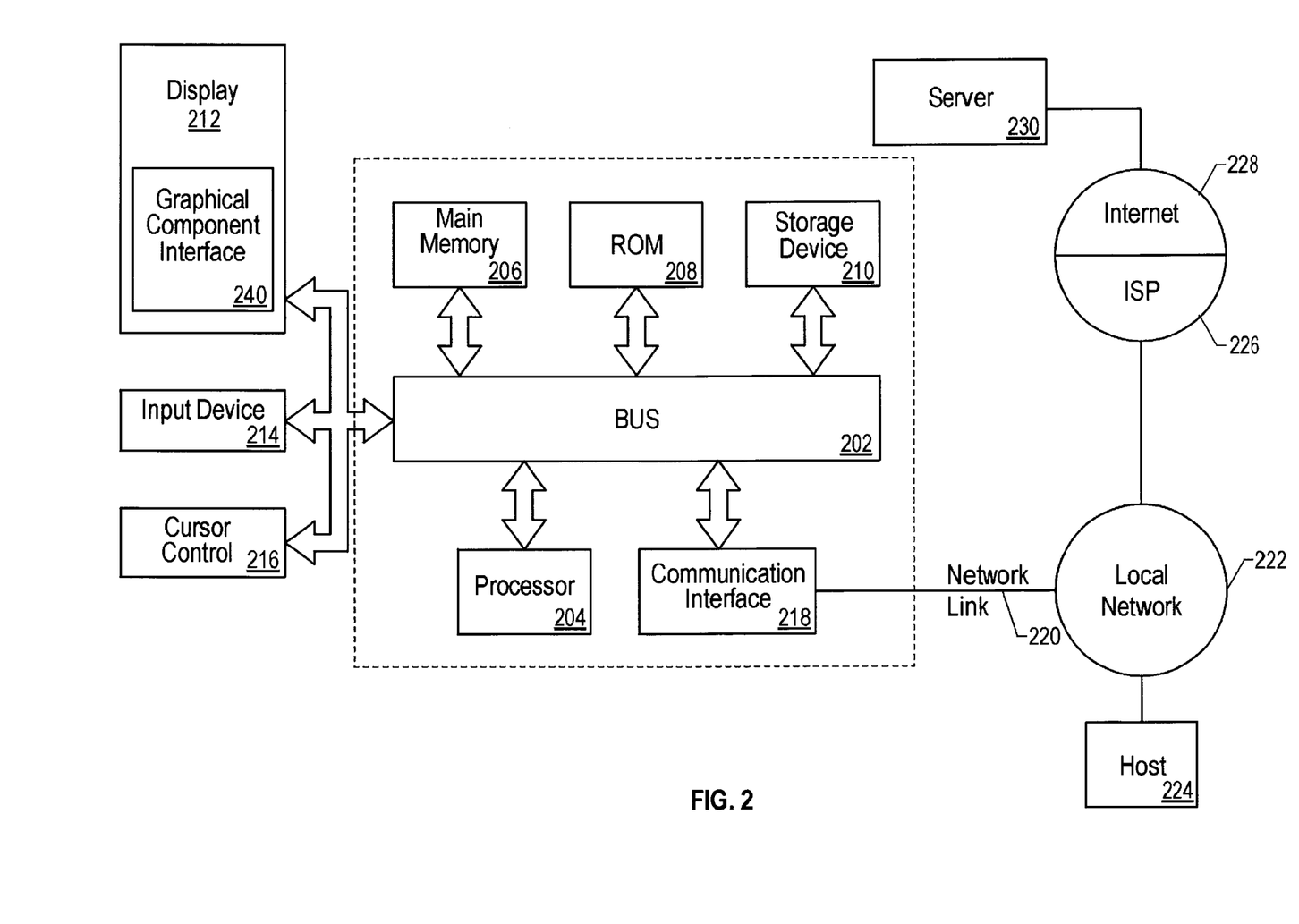
FIG. 2 is a computer system upon which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for depicting an arrangement of graphical components. According to one embodiment of the invention, depicting an arrangement of graphical components is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for depicting an arrangement of graphical components as described herein.

The received code may be executed by processor 204 as it is received, and/or stored in storage device 210, or other non-volatile storage for later execution. In this manner, computer system 200 may obtain application code in the form of a carrier wave.

Graphical Component Hierarchy

According to an embodiment of the present invention, a 3-D artist creates 3-D models through a graphical component interface. Included in the graphical component interface is a graphical component hierarchy. A graphical component hierarchy is a graphic generated and displayed within a window by a computer system. A graphical component hierarchy is used to depict a hierarchical arrangement of graphical components, and how those graphical components affect the properties of each other. In addition, a user may select graphical components depicted in a graphical component hierarchy for the purpose of performing a set of operations upon the selected graphical components, such as altering their properties. The user may alter the graphical component hierarchy to affect the properties of graphical components, and the way in which they are manipulated together to form images. The graphical component hierarchy includes images for each graphical component, to graphically represent how they affect a final image at various stages.

Exemplary Graphical Component Hierarchy

Figure 3A:
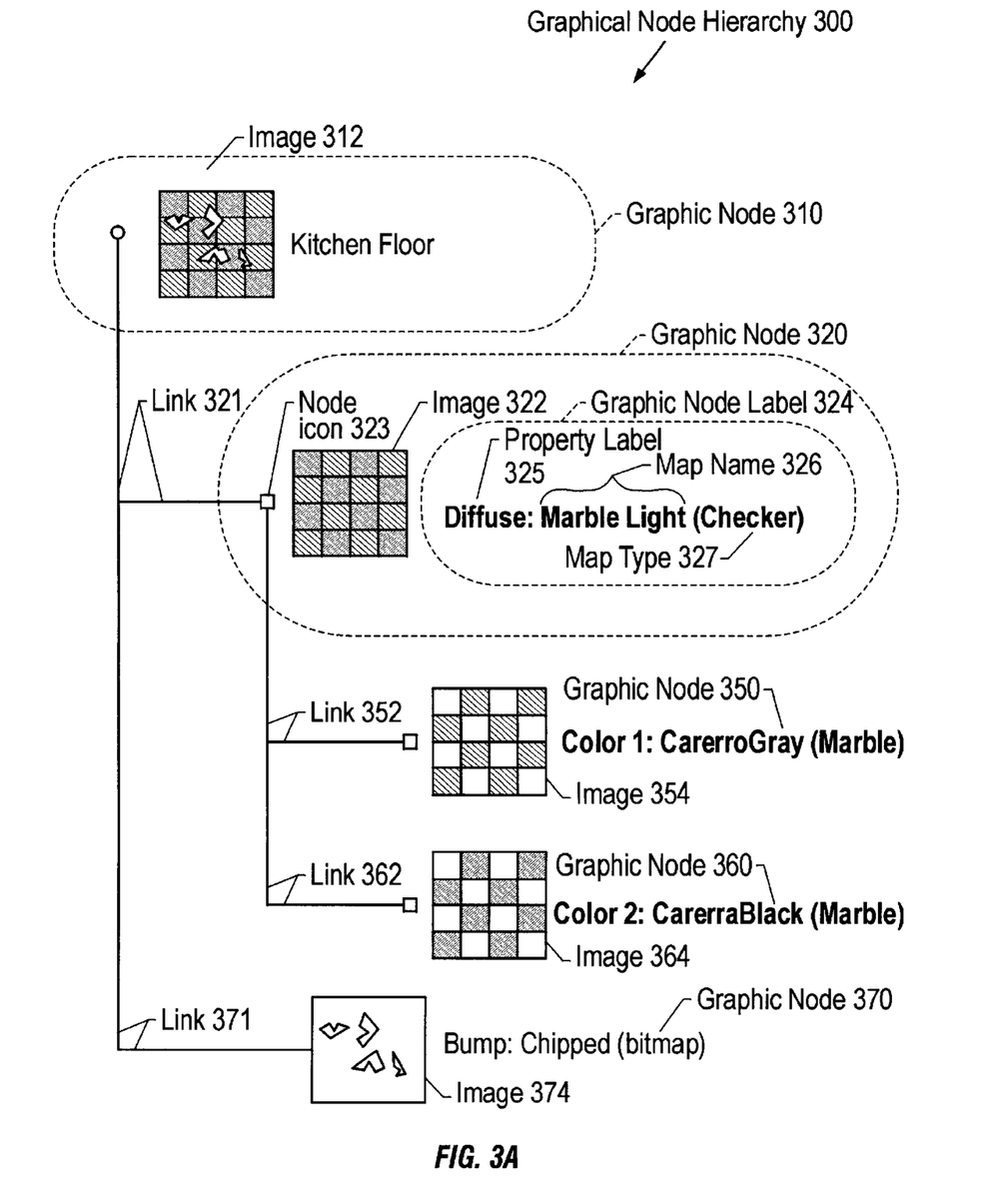
FIG. 3A is a graphical component hierarchy depicting graphical components that are hierarchically related.

FIG. 3A shows a graphical component hierarchy according to an embodiment of the present invention. Graphical component hierarchy 300 depicts material KITCHEN FLOOR and the graphical components that are used to define the properties of material KITCHEN FLOOR. Map MarbleLight and map Chipped are used to define the diffuse and bump properties of material KITCHEN FLOOR respectively. Graphical component hierarchy 300 includes graphic nodes, links between graphic nodes, and images associated with graphic nodes. Each of these elements of a graphical component hierarchy shall now be described in detail.

Graphic Nodes

A graphic node is a graphic that represents a particular graphical component in a graphical component hierarchy, and may include multiple graphics. Graphic node 310 represents material KITCHEN FLOOR, graphic node 320 represents map MarbleLight, and graphic node 370 represents map CHIPPED. Graphic node 320, which represents map MarbleLight, includes a variety of graphics, and in particular, includes node icon 323, image 322, and graphic node label 324. Image 322 is an image of map MarbleLight.

Graphic node 320 includes property label 325, which specifies the material KITCHEN FLOOR property that map MarbleLight is used to define. Map name 326 is a label specifying the name of the map MarbleLight. Map type label 327 specifies the map type of MarbleLight, which is marble. Examples of other map types include Gray Scale, Gradient, Wood, Mask, and Flat Mirror.

Links

A link 321 visually links graphic node 310 to graphic node 320, link 371 visually links graphic node 310 to graphic node 370. With respect to link 321, graphic node 310 is referred to as a parent graphic node and graphic node 320 as a child graphic node because graphic node 310 is linked to graphic node 320, and graphic node 320 is at the next lower level in graphical component hierarchy 300. Likewise, with respect to link 352, graphic node 320 is the parent graphic node and graphic node 350 is the child graphic node. A graphical component that corresponds to a parent graphical node is referred to as a parent graphical node. A graphical component that corresponds to a child graphical component is referred to as a child graphical component.

A link in a graphical component hierarchy represents a manipulation between a parent graphical component and the linked child graphical component that is performed to affect a property of the parent graphical component. The particular manipulation performed depends on a variety factors, such as what property the linked child graphical component is assigned, and the map type of the child graphical component and parent graphical component.

For example, link 321 represents a manipulation between material KITCHEN FLOOR and map MarbleLight to affect the diffuse property of material KITCHEN FLOOR by superimposing the image of map MarbleLight upon the surface represented by material KITCHEN FLOOR. Link 371 represents a manipulation between material KITCHEN FLOOR and map Chipped. Map Chipped is a bitmap used to define the bump property material KITCHEN FLOOR. In a material whose bump property is defined by a bitmap, the areas in an image of the material that correspond to the lighter areas in the bitmap appear to be raised, and those that correspond to the darker areas of the bitmap appear to be lowered.

Graphical component hierarchy 300 graphically depicts the maps assigned to various properties of map MarbleLight. Graphic node 350 represents map CarerraGray, which is assigned to the Color1 property of map MarbleLight. The Color1 defines one pair of squares of the same color in a Checker type map. Graphic node 360 represents a map CarerraBlack, which is assigned to the Color2 property of map MarbleLight. Color2 defines the pair of squares of the other color in a Checker type map.

Link 352 represents a manipulation between map MarbleLight and map CarreraGrey to superimpose map CarreraGrey, forming the pair of squares of one color in a checker pattern. Likewise, link 362 represents a manipulation between map MarbleLight and map CarreraBlack to superimpose map CarreraBlack, forming the pair of squares of the other color in a checker pattern.

Images

Each graphic node of graphical component hierarchy 300 includes an image that depicts a graphical component associated with the node. Graphic node 310 includes an image 312 of material Kitchen Floor, graphic node 350 includes an image of map CarerraGray, graphic node 360 includes an image 364 of map CarerraBlack, and graphic node 370 includes an image of map Chipped.

Each image reflects the application of the properties associated with the graphical component. Specifically, image 312 reflects application of the diffuse and bump properties of material Kitchen Floor. The diffuse property is defined by map Marble Light, and the bump property by map Chipped. Image 312, which reflects a combination of Map Marble Light and Chipped, thus depicts a checker marble floor with chips.

Image 322 reflects the application of the Color1 and Color2 properties of map MarbleLight. The Color1 is defined by map CarerroGray, Color2 by map CarreraBlack. Image 322, which reflects the combination Map CarerroGray and Carrerra Black, thus depicts a checkered marble floor.

Figure 3B:
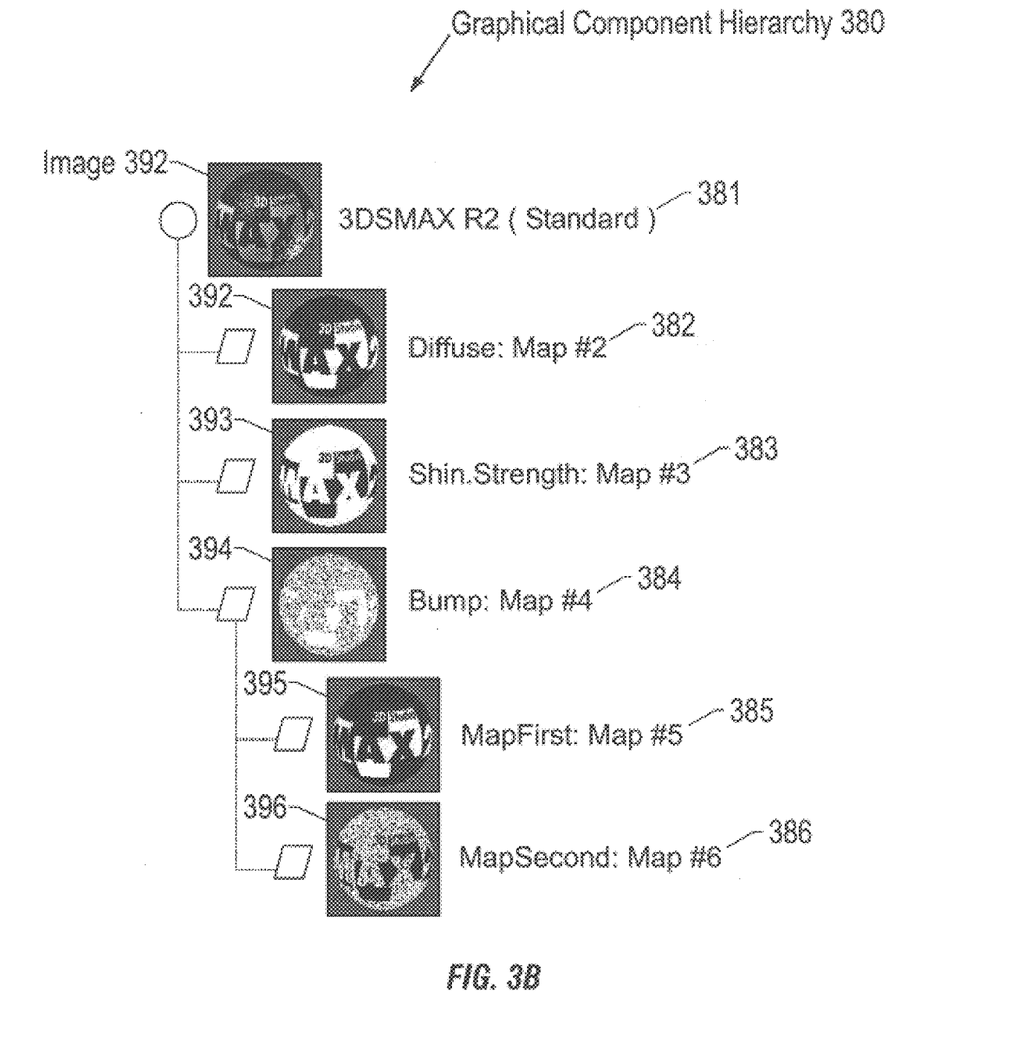
FIG. 3B is a graphical node hierarchy depicting graphical components that are hierarchically related.

FIG. 3B depicts another graphical component hierarchy that illustrates how the arrangement of images in a graphical component hierarchy visually portray how graphical components coalesce to form a final image. Graphical component hierarchy 300 graphically depicts the maps assigned to various properties of material 3DSMAX R2. Graphic node 381 represents 3DSMAX R2. Image 391 depicts 3DSMAX R2. Graphic nodes 382, 383, and 384 represent map 2, map 3, and map 4. Map 2, map 3, and map 4 are used to define the diffuse, shininess strength, and bump properties of material 3DSMAX R2 respectively. Map 2, map 3, and map 4 are depicted in images 392, 393, and 394 respectively.

Graphic nodes 385 and 386 represent map 5 and map 6 respectively. Map 5 and map 6 are used to define the MapFirst and MapSecond properties of map 4. Map 5 and map 6 are depicted in images 395 and 396.

The hierarchical structure of a graphical component hierarchy provides many advantages. A graphical component hierarchy is especially useful for depicting graphical components that are themselves hierarchically related, presenting the graphical components in an arrangement that mirrors the relationship between them. The individual graphic nodes may be quickly read to ascertain what parent graphical component properties a child graphical component affects.

Furthermore, the hierarchy of images presented by a graphical component hierarchy vividly portray in the mind of the artist how the graphical components coalesce together to form the final image. With this in mind, a 3-D artist may visualize what property changes are needed to what graphical components to generate a desired effect. The 3-D artist may then experiment with those property changes, entering data through the graphical component interface, immediately seeing their effect through the images presented by a graphical component hierarchy.

Modification of Graphical Components

One function performed by graphical component hierarchy 300 is to provide a mechanism for quickly invoking dialogue boxes that receive data from a 3-D artist specifying properties of graphical components. Before explaining in greater detail how this function is performed, it is useful to illustrate some of the dialogue boxes used for entering such data.

Figure 4:
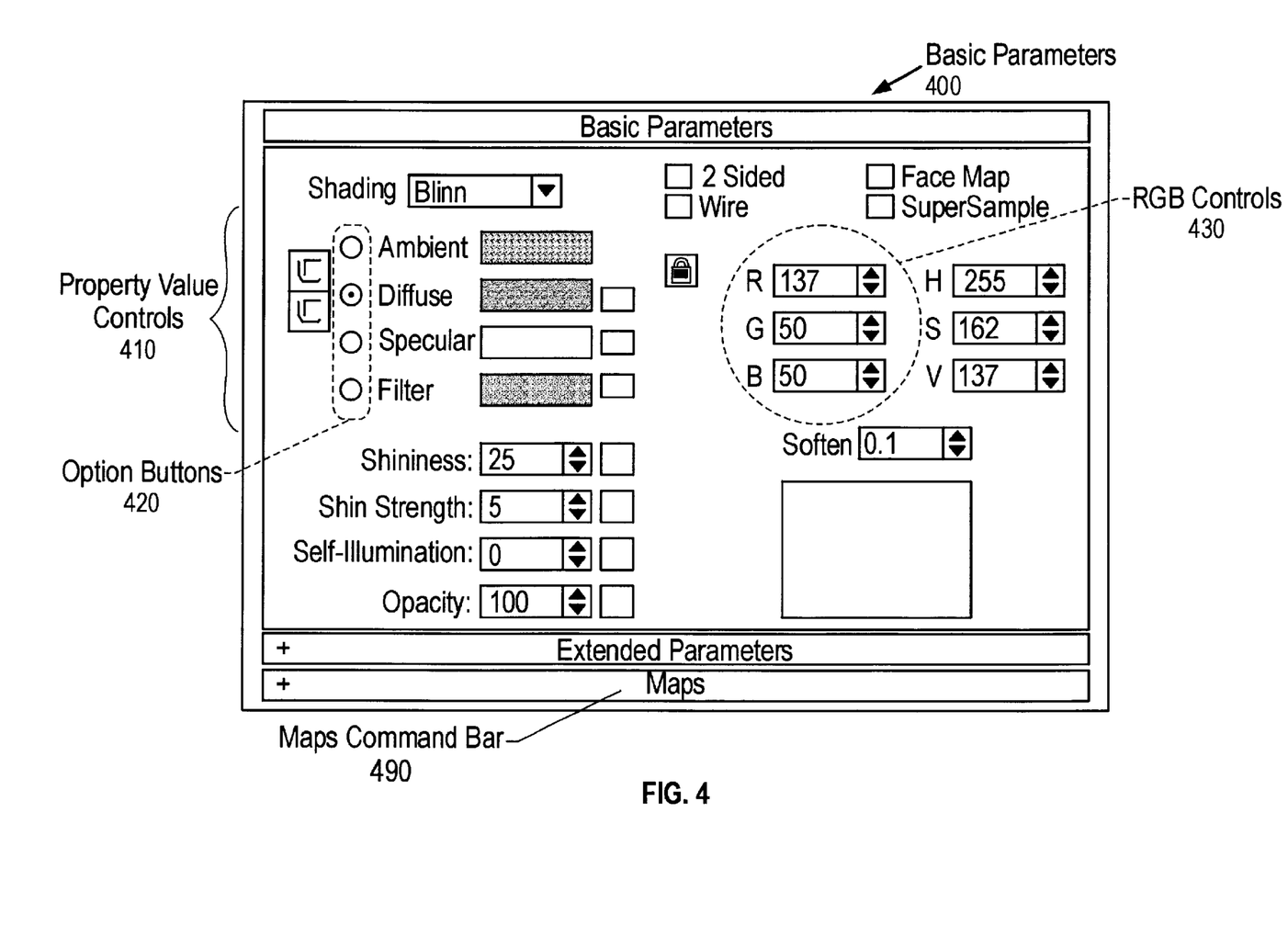
FIG. 4 is a dialogue box used to receive data from a user specifying material properties according to an embodiment of the present invention.

FIG. 4 is a block diagram depicting basic parameters 400, a dialogue box through which a 3-D artist may edit material KITCHEN FLOOR. Basic parameters 400 includes a variety of graphical user controls which may be manipulated to affect various properties of material KITCHEN FLOOR. These graphical user controls include reflection property values controls 410, which are graphical user controls for entering values for the ambient, diffuse, specular, and filter properties of material KITCHEN FLOOR. A 3-D artist may edit one of these properties by selecting the one of option buttons 420 that correspond to the ambient, diffuse, specular, or filter properties. When data is received that indicates that the option button that corresponds to a property has been selected, values for that property are displayed in RGB controls 430. RGB controls 430 are graphical user controls for entering the amount of red, green, and blue that is reflected for a particular material property.

How the values for red, green, and blue affect a particular property of material KITCHEN FLOOR depend on whether a map is assigned to that property. To assign maps to a property, the 3-D artist selects the maps command bar 490. In response, a dialogue box is displayed for assigning maps to material properties.

Figure 5:
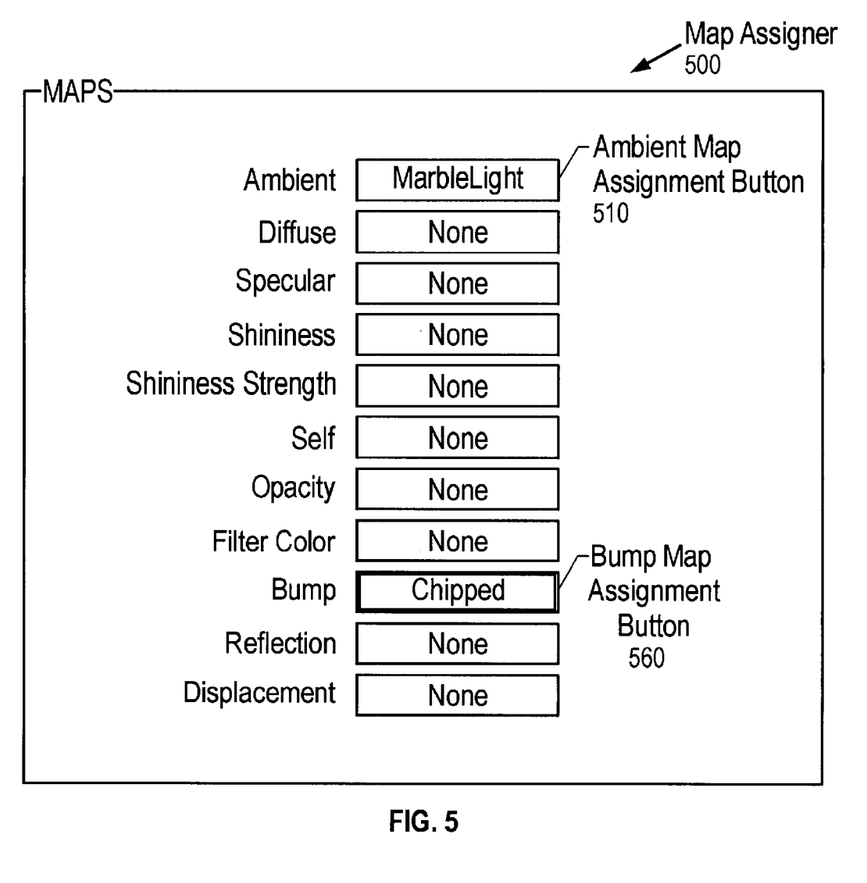
FIG. 5 is a dialogue box for assigning maps to properties of a material according to an embodiment of the present invention.

FIG. 5 is a block diagram depicting Map Assignor 500, which is a dialogue box that includes graphical user controls which may be manipulated to assign maps to a property of material KITCHEN FLOOR. Map assignor 500 includes an ambient map assignment button 510 and bump map assignment button 560. Ambient map assignment button 510 is used to assign a map to an ambient property of material kitchen floor, and bump map assignment button 560 is used to assign a map to the bump property of material KITCHEN FLOOR.

For example, to assign a map to the ambient property of material kitchen floor, a 3-D artist uses a mouse to click on ambient map assignment button 510. In response, a dialogue box for searching for files containing maps ("map browser") is displayed. The 3-D artist selects map MarbleLight through the map browser. When computer system 200 receives input indicating that a 3-D artist has selected map MarbleLight, computer system 200 displays the name of map MarbleLight within map ambient map assignment button 510, and activates a dialogue box appropriate for the map type of MarbleLight, which is map type Checker.

Figure 6:
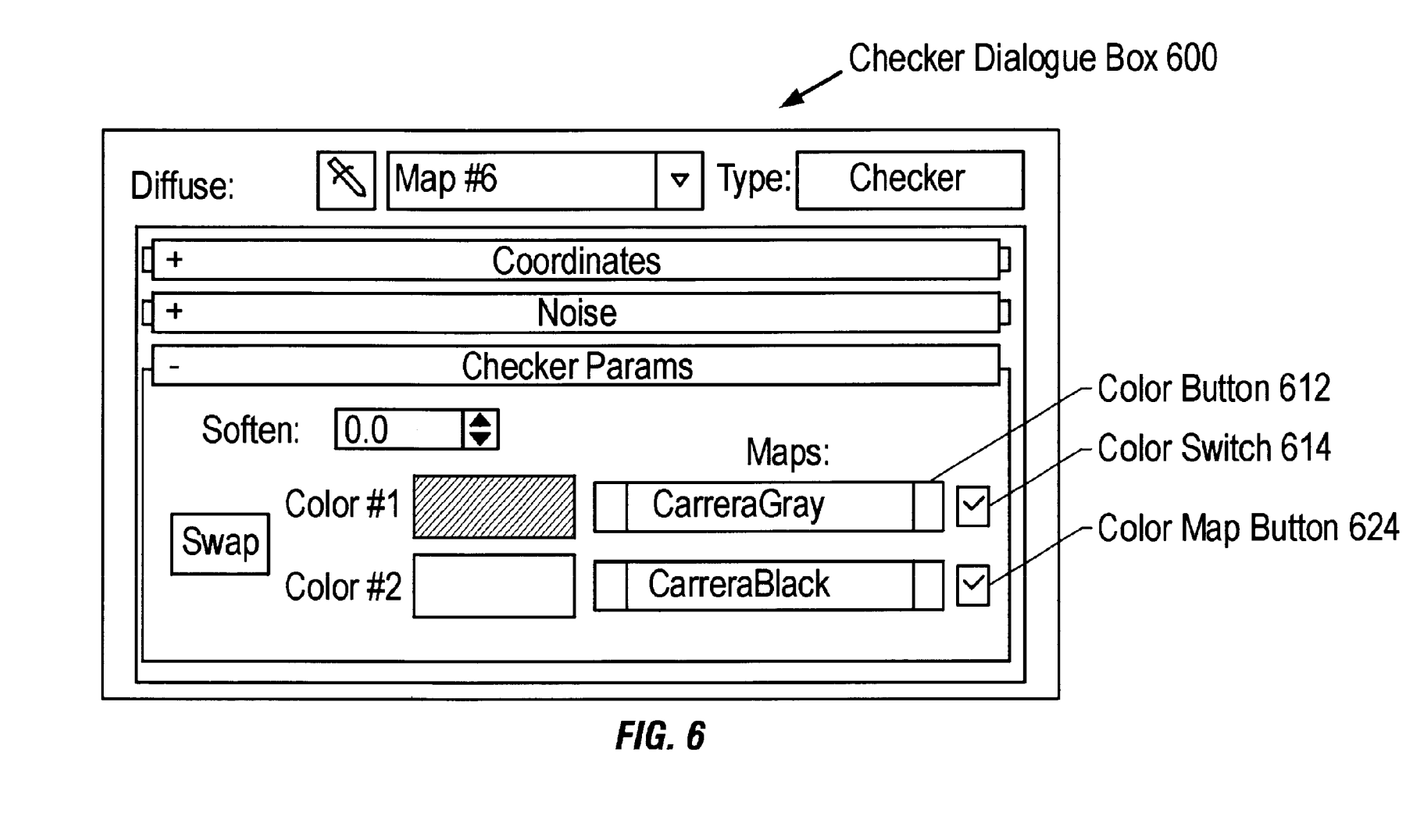
FIG. 6 is a dialogue box for assigning maps to properties of another map according to an embodiment of the present invention.

FIG. 6 is a block diagram depicting Checker dialogue box 600. Checker dialogue box 600 is a dialogue box that includes graphical user controls which may be manipulated to assign maps to a property of map MarbleLight. Color1 map button 612 is used to assign a map to the Color1 property of map MarbleLight. When Color1 map button 612 is depressed, a map selector appears to select a map to assign to the Color1 property. Likewise, Color2 map button 614 is used to assign a map to the Color2 property of map MarbleLight, in a manner similar to that described for the Color1 map button 612.

Color1 switch box 612 is a check box graphical user control which may be toggled between an on and off state. When computer system 200 receives input indicating that the user has manipulated the Color2 switch box to an off state, material Kitchen Floor is rendered as if map Carerra-Gray has not been assigned to the Color1 property of map MarbleLight. Color2 switch box button 624 is operated upon in the same manner with respect to the Color2 property of map MarbleLight.

Selecting and Editing Graphical Components Through the Graphical Component Hierarchy Graphical component hierarchy 300 may be used to quickly invoke a dialogue box for a particular graphical component that is depicted by graphical component hierarchy 300. For example, to activate basic parameters 400, the 3-D artist uses a mouse to click on graphic node 310. To cause computer system 200 to activate a checker dialogue box 600, the 3-D artist uses a mouse to click on graphic node 320. While graphical component hierarchy 300 has been illustrated for use in selecting graphical components for which to display dialogue boxes, graphical component hierarchy 300 can be used for a variety of other purposes that require the selection of graphical components.

In addition to selecting a graphical component, the structure of graphical component hierarchy 300 may be rearranged through a drag and drop operation. The drag and drop operation may be used to alter properties of the graphical components, or the way the graphical components are manipulated.

For example, a 3-D artist may, through a drag and drop operation, switch the positions within graphical component hierarchy 300 of graphic node 350 and graphic node 360. When this occurs, map CarerraGray becomes the Color2 property of map MarbleLight, and map CarerraBlack becomes the Color1 property.

In an embodiment of the present invention, the position of a graphic node within graphical component hierarchy 300 dictates the order in which computer system 200 manipulates a parent graphical node with its child graphical components. Thus graphical component hierarchy 300 may be rearranged to affect the order that manipulations are performed between material KITCHEN FLOOR and each of its child graphical components, maps MableLight and Chipped.

For example, a 3-D artist may, through a drag and drop operation, switch the positions within graphical component hierarchy 300 of graphic node 320 and graphic node 370, along with the tree of graphic nodes that branch from them. As a result, when computer system 200 forms an image for material KITCHEN FLOOR, computer system 200 manipulates map Chipped with material KITCHEN FLOOR before it manipulates map MarbleLight with material KITCHEN FLOOR. A change in the order in which graphical components are manipulated may affect the final resulting image.

While a graphical component hierarchy illustrated herein depicts graphical components that are materials or maps, a graphical component hierarchy is not limited to depicting materials or maps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of visually depicting how individual components of an image affect the appearance of the image, the method comprising the steps of:

displaying, in a graphical hierarchy, a graphic node for each of a plurality of graphical components that affect the appearance of the image, wherein links between said graphic nodes represent manipulations performed on respective graphical components to produce said image, wherein the step of displaying in a graphical hierarch includes:

displaying at least one parent graphic node liked to a plurality of child graphic nodes, wherein the parent graphic node represents a parent graphical component associated with said image and the plurality of child graphic nodes each represent a child graphical component that affects the appearance of said image; and displaying as part of said parent graphic node said image in a manner that reflects results of manipulations that correspond to the links between the parent graphic node and the plurality of child graphic nodes.

2. The method of claim 1, further including the step of:

modifying a property of a first child graphical component of said parent graphical component; and reflecting said modified property in said image.

3. The method of claim 1, further including the steps of:

receiving a signal that indicates that a user has clicked on a first graphic node which corresponds to a first graphical component of said plurality of child graphical components; and displaying a user interface for receiving from a user data that specifies property values for said first graphical component.

4. The method of claim 1, further including the steps of:

displaying a first child graphic node that includes an image of a first child graphical component of said plurality of child graphical components;

receiving data specifying at least one modification to at least one property of said first child graphical component; and reflecting said modifications in both said image included in said first child graphic node and said image included in said parent graphic node.

5. The method of claim 1, further including the steps of receiving a signal indicating that a user has altered, through a drag and drop operation, a position of a first child graphic node of said plurality of child graphic nodes;

establishing a set of new links between said plurality of graphic nodes that reflect the altered position; and reflecting in said image manipulations that correspond to said set of new links.

6. The method of claim 1, further including the step of displaying a first link between the parent graphic node and a child graphic node of said plurality of child graphic nodes to represent a manipulation used to form a diffuse property of a surface.

7. The method of claim 1, further including the step of displaying a first link between the parent graphic node and a child graphic node of said plurality of child graphic nodes to represent a manipulation used to form a bump property of a surface.

8. The method of claim 1, wherein the step of displaying at least one parent graphic node linked to a plurality child graphic nodes includes:

displaying a first parent graphic node that represents material for a surface; and displaying a child graphic node that represents a map that represents a pattern to apply to a surface.

9. The method of claim 8, wherein the step of displaying a child graphic node that represents a map includes displaying a child graphic node that represents a bit map.

10. The method of claim 8, wherein the step of displaying a child graphic node that represents a map includes displaying a child graphic node that represents a procedural map.

11. A computer-readable medium carrying one or more sequences of one or more instructions for visually depicting how individual components of an image affect the appearance of the image, the one or more sequences of one or more instructions including instructions which, when executed by one or more processors, cause the one or more processors to perform the steps of:

displaying, in a graphical hierarchy, a graphic node for each of a plurality of graphical components that affect the appearance of the image, wherein links between said graphic nodes represent manipulations performed on respective graphical components to produce said image, wherein the step of displaying in a graphical hierarchy includes:

displaying at least one parent graphic node linked to a plurality of child graphic nodes, wherein the parent graphic node represents a parent graphical component associated with said image and the plurality of child graphic nodes each represent a child graphical component that affects the appearance of said image; and displaying as part of said parent graphic node said image in a manner that reflects results of manipulations that correspond to the links between the parent graphic node and the plurality of child graphic nodes.

12. The computer-readable medium of claim 11, further including sequences of instructions for performing the step of:

modifying a property of a first child graphical component of said parent graphical component; and reflecting said modified property in said image.

13. The computer-readable medium of claim 11, further including sequences of instructions for performing the steps of:

receiving a signal that indicates that a user has clicked on a first graphic node which corresponds to a first graphical component of said plurality of child graphical components; and displaying a user interface for receiving from a user data that specifies property values for said first graphical component.

14. The computer-readable medium of claim 11, further including sequences of instructions for performing the steps of:

displaying a first child graphic node that includes an image of a first child graphical component of said plurality of child graphical components;

receiving data specifying at least one modification to at least one property of said first child graphical component; and reflecting said modifications in both said image included in said first child graphic node and said image included in said parent graphic node.

15. The computer-readable medium of claim 11, further including sequences of instructions for performing the steps of:

receiving a signal indicating that a user has altered, through a drag and drop operation, a position of a first child graphic node of said plurality of child graphic nodes;

establishing a set of new links between said plurality of graphic nodes that reflect the altered position; and reflecting in said image manipulations that correspond to said set of new links.

16. The computer-readable medium of claim 11, further including sequences of instructions for performing the step of displaying a first link between the parent graphic node and a child graphic node of said plurality of child graphic nodes to represent a manipulation used to form a diffuse property of a surface.

17. The computer-readable medium of claim 11, further including sequences of instructions for performing the step of displaying a first link between the parent graphic node and a child graphic node of said plurality of child graphic nodes to represent a manipulation used to form a bump property of a surface.

18. The computer-readable medium of claim 11, wherein the step of displaying at least one parent graphic node linked to a plurality child graphic nodes includes:

displaying a first parent graphic node that represents material for a surface; and displaying a child graphic node that represents a map that represents a pattern to apply to a surface.

19. The computer-readable medium of claim 18, wherein the step of displaying a child graphic node that represents a map includes displaying a child graphic node that represents a bit map.

20. The computer-readable medium of claim 18, wherein the step of displaying a child graphic node that represents a map includes displaying a child graphic node that represents a procedural map.

\* \* \* \* \*

UNITED STATES PATENT AND TRADEMARK OFFICE
CERTIFICATE OF CORRECTION

PATENT NO. : 6,473,081 B1
DATED : October 29, 2002
INVENTOR(S) : Silva et al.

It is certified that error appears in the above-identified patent and that said Letters Patent is hereby corrected as shown below:

<u>Column 11,</u>
Line 65, replace "hierarch" with -- hierarchy --;
Line 67, replace "liked" with -- linked --.

Signed and Sealed this

Twenty-fifth Day of February, 2003

JAMES E. ROGAN
*Director of the United States Patent and Trademark Office*